United States Patent [19]

Hochanadel

[11] 4,436,012

[45] Mar. 13, 1984

[54] PENDULUM-TYPE PRODUCT SLICING MACHINE

[75] Inventor: Thomas A. Hochanadel, Pickerington, Ohio

[73] Assignee: J. E. Grote Pepp-A-Matic Co., Inc., Columbus, Ohio

[21] Appl. No.: 321,244

[22] Filed: Nov. 13, 1981

[51] Int. Cl.³ .......................... B26D 7/06; B23D 53/06

[52] U.S. Cl. ..................................... 83/703; 83/409.2; 83/411 A

[58] Field of Search .................................. 83/703-705, 83/409.1, 409.2, 411 R, 411 A

[56] References Cited

U.S. PATENT DOCUMENTS

| | | | |
|---|---|---|---|
| 2,326,509 | 8/1943 | Womack | 83/411 R |
| 2,692,429 | 10/1954 | Schweller et al. | 83/411 R |
| 3,667,522 | 6/1972 | Bingham | 83/391 X |
| 4,050,339 | 9/1977 | Soleri | 83/411 A |
| 4,230,007 | 10/1980 | Grote et al. | 83/409.2 |

*Primary Examiner*—James M. Meister
*Attorney, Agent, or Firm*—Robert E. Stebens

[57] ABSTRACT

A pendulum-type product slicing machine is provided wherein the product is carried on a support frame mounted for swinging movement in an arc with respect to a slicing blade. The slicing blade is an endless band which is supported in an inclined plane such that the lower end of the product carrier may traverse the lower run of the blade for complete severing of the product carried thereby. Mechanisms are provided for control of the thickness of the slices and for automatic operation of the carrier.

15 Claims, 18 Drawing Figures

PENDULUM-TYPE PRODUCT SLICING MACHINE

FIELD OF THE INVENTION

This invention relates to apparatus for the slicing of products and, in particular, slicing of food products. It relates more specifically to an apparatus which is provided with a carrier for elongated food products adapted to swing on a pivot in the manner of a pendulum relative to an elongated, longitudinally movable slicing blade for severing a slice from the bottom end of the product during each stroke of the carrier.

BACKGROUND OF THE INVENTION

Various types of food product slicing machines have been devised and employed in the food industry to produce planar slices of the particular product. In general, these machines are of the type wherein a carrier is provided for the support and reciprocating or cyclic movement of a quantity of the food product relative to a slicing blade. Rotary-type blades are customarily used in these machines, although newer cutting mechanisms emply flexible band-type blades. An example of the flexible band-type blade and an apparatus which utilizes it for effecting slicing is the structure shown in U.S. Pat. No. 4,230,007 issued on Oct. 28, 1980 to James E. Grote. This machine has a flexible blade which extends around a pair of pulleys or support wheels for support of a portion of the blade in a horizontal cutting plane. The food product which is in the form of a plurality of elongated sticks, pepperoni, for example, is carried in a turret in a vertically oriented manner for gravity feed and the turret is reciprocated across the continuously moving blade to sequentially sever thin slices of predetermined thickness from the bottom end of each of the several sticks. The slices, as they are severed, are deposited by gravity onto a moving receiver carried on a conveyor at substantially the same speed as the cutting rate.

Another example of a band-type mechanism for the cutting of food products is that shown in U.S. Pat. No. 4,050,339 issued to Richard A. Soleri on Sept. 27, 1977. The food product carrier in the apparatus of this patent is of a carrousel type wherein a series of product carriers are revolved in a circular path and sequentially pass over the cutting portion of band-type blades for severing slices of predetermined thickness. The food product carriers frictionally grip the product to be cut by means of spring biased jaws that operate to permit incremental gravity feed. An apparatus of this type requires a large number of product carriers if any reasonably acceptable operating speed is to be obtained because of the full circle path of movement. Furthermore, an apparatus of this type requires a large amount of floor space.

Still anothr example of a slicing apparatus is U.S. Pat. No. 3,667,522 issued to David W. Bingham on June 6, 1972. The apparatus has a cutting blade which is movably mounted on a frame to oscillate along an arcuate path of travel in a horizontal plane beneath a plurality of fixed position, vertically extending food product chutes through which the product is gravity fed. The oscillating blade cuts slices from the lower ends of the food product which is contained in vertical guide tubes of chutes projecting upwardly with respect to the horizontal cutting plane in which the cutter blade oscillates. A disadvantage of an apparatus of this type is that suitable mechanisms to support an oscillating movement of a cutting blade in a precise cutting plane is difficult to construct and to maintain in proper adjustment. The blade support mechanisms are relatively heavy and their mass imposes additional stress on the apparatus as a consequence of the substantial forces required to effect oscillating movement.

Machines of the above types require a large quantity of the food product to be supported in the product carriers. Further, in the case of the Grote patent, the turret is a relatively large, heavy device and the speed of the machine is, therefore, substantially inhibited and limited to a slow rate of reciprocating operation. Also, the machine shown in U.S. Pat. No. 4,050,339, while being capable of high revolving speed for fast cutting operations, is not particularly suited for combining its operation with a conveyor used to transport receivers for the sliced food products as a consequence of its cutting speed resulting in problems of synchronization of its operation with a conveyor for receiving the slices.

SUMMARY OF THE INVENTION

In accordance with this invention, a pendulum type slicing apparatus is provided and includes a food product carrier mounted for swinging movement from one side to the other relative to slicing means having an elongated, horizontally, disposed blade. The food product carrier includes a rigid frame structure mounted on a horizontal pivot axis of a structural frame and is provided with means for reciprocating the carrier in an oscillatory manner. Incorporated in the carrier are a plurality of product receivers in the form of elongated tubes that are open at both the top and bottom. The product to be sliced, which product may be of an elongated stick form, is disposed in a tubular receiver through which it feeds by gravity toward a bottom end and from which it projects for slicing by the slicing mechanism. Cutting of the slices from the bottom end of the product sticks is effected by slicing means which includes a flexible, endless band blade having a portion of the blade mounted for movement transversely across the path of movement of the product carrier and the product carried thereby. In a preferred embodiment, the slicing means comprises an endless band blade carried by a pair of pulleys or support wheels for continuous revolution in a plane that is substantially vertically oriented, although it is slightly inclined to accommodate movement of the product carrier. The slicing means is also supported on the structural frame of the apparatus in a position where a bottom run of the band is at a relatively lowermost position and disposed in a substantially horizontal cutting plane adjacent which the product is caused to travel as a consequence of the oscillatory movement of the product carrier. With this structure, essentially all of the components are thus positioned above the cutting plane whereby the slices as they are severed from the product sticks may freely drop by gravity onto a receiver such as that which may be carried by a conveyor located below the operating blade and carrier components of the apparatus.

Control of the thickness of the slices that are severed during each stroke of the product carrier is effected by a product support plate that is also mounted closely adjacent the horizontal cutting plane. This product support plate includes two sections with each section being disposed at opposite sides of the effective portion of the cutting blade. Thus, the product will be supported on one or both these plate sections throughout its oscillatory movement from one to the other side of the blade, thereby preventing the product stick from merely dropping out of the tubular receivers. A first section of the support plate structure is positioned in preceding relationship to the cutting edge of the blade and is primarily effective in controlling the thickness of the product slices. By appropriately adjusting the spaced relationship of the upper surface of this plate with respect to the cutting edge of the blade, it is possible to vary the relative vertical position of those components and thus vary the thickness of the slices that will be severed. Control mechanisms are mechanically coupled with this first support section to preferably enable adjustment of the plate as to angular relationship to the cutting plane as well as its vertical spacing to the bottom of the product carrier.

Slicing means provided for use with the apparatus of this invention is advantageously of the type disclosed in U.S. Pat. No. 4,230,007 which was briefly discussed in the Background of the Invention. This structure is essentially that which is shown in the cited patent although in this combined mechanism, it is the bottom run of the blade that is utilized for the slicing function. Accordingly, a support and guide is positioned to cooperate with the lower run of the blade and thereby maintain that portion of the blade in a precisely located position to assure that the cutting edge will be maintained in the desired cutting plane for accurate slicing of the product in predetermined thickness as well as maintaining uniformity of thickness. As previously indicated, the flexible-band supporting wheels are positioned at an angle with respect to a vertical plane in much the same manner as disclosed in U.S. Pat. No. 4,230,007 with the upper run being inclined in a direction away from the region in which the product carrier oscillates. With this arrangement, when having the proper angle relationship of the blade, it is possible to accommodate the product carrier throughout its full extent of oscillation as it passes the cutting edge as is determined by the dimension of the product which is to be sliced. A particular advantage of the band blade in an apparatus of this type is that such apparatus is thus enabled to accommodate various sizes of product sticks or food product articles. By providing a band-type cutting blade of sufficient length to obtain a predetermined clear spacing between the blade supporting pulleys, it is readily possible from a practical standpoint to accommodate a large number of relatively small size product sticks or a comparatively smaller number of larger product sticks. By product sticks, it is intended to include those products which may comprise a number of smaller units that are merely positioned in stacked relationship in a respective tubular receiver of the product carrier and is not intended to be limited to only products such as food sticks including cheese and processed type meats. Also, a plurality of product receives having different cross-sectional areas for concurrently producing different sized product slices may be incorporated in a particular apparatus.

To improve the performance of the apparatus, it is preferred that the product carrier include a pusher bar which accommodates the variations in spacing between the bottom end of the carrier receptacles and the top surface of the thickness determining support plate. This bar is mounted on the apparatus to also swing in the manner of a pendulum to cooperate in movement with the product carrier during its oscillatory excursions in traversing the cutting blade and, as a consequence of such movement, to also vertically oscillate with respect to the carrier. Providing of a pusher bar capable of functioning in this manner not only provides a stop plate carried at the trailing side of the product carrier receptacles during a forward or cutting stroke for back up support for that portion of the product projecting downwardly out of the receptacle, it also assures that the end pieces that will ultimately develop from slicing of an elongated product stick will not be ejected rearwardly from the carrier and over the support plate as a consequence of the resistance encountered from the slicing means blade.

Drive means is also provided for causing revolution of the band-type blade of the slicing mechanism and the oscillatory movement of the product carrier. This drive means in the preferred embodiment comprises a hydraulic system including an electrically driven hydraulic fluid pump that provides the necessary pressurized fluid for operation of a fluid motor driving the carrier and an electric motor is provided for revolving the flexible blade of the slicing mechanism. A hydraulic ram comprising a cylinder and piston unit may be advantageously used to effect the oscillatory, swinging movement of the product carrier. As to this hydraulic ram, the cylinder may be mounted on the structural frame of the apparatus with the piston connected by means of a piston rod and suitable mechanical connections to the product carrier. Appropriate timing mechanisms may also be incorporated in the total control system to obtain oscillation of the product carrier in predetermined relationship to an underlying conveyor which may be transporting receivers for the food product slices and located beneath the operating mechanism. Alternative operation of the apparatus may be the continuous type slicing for producing a stack of sliced product suitable for packaging.

The product slicing apparatus of this invention is not only capable of readily performing the slicing operations to produce an accurately controlled thickness slice at a fast operating rate, but it is also an extremely safe operating mechanism. The structure is arranged with the components located relative to each other in a manner whereby the relatively dangerous operating components may be easily covered by screens and protective covers. An operator is not unduly exposed to the moving components through the use of such protective covers and screens, but the operator may easily resupply the product carrier with additional product as may be necessary during the course of operation.

These and other objects and advantages of this invention will be readily apparent from the following description of an illustrative embodiment thereof. Reference will also be made to the accompanying drawings which illustrate a preferred embodiment of the invention.

DESCRIPTION OF THE DRAWING FIGURES

DESCRIPTION OF THE ILLUSTRATIVE EMBODIMENTS

Figure 1:
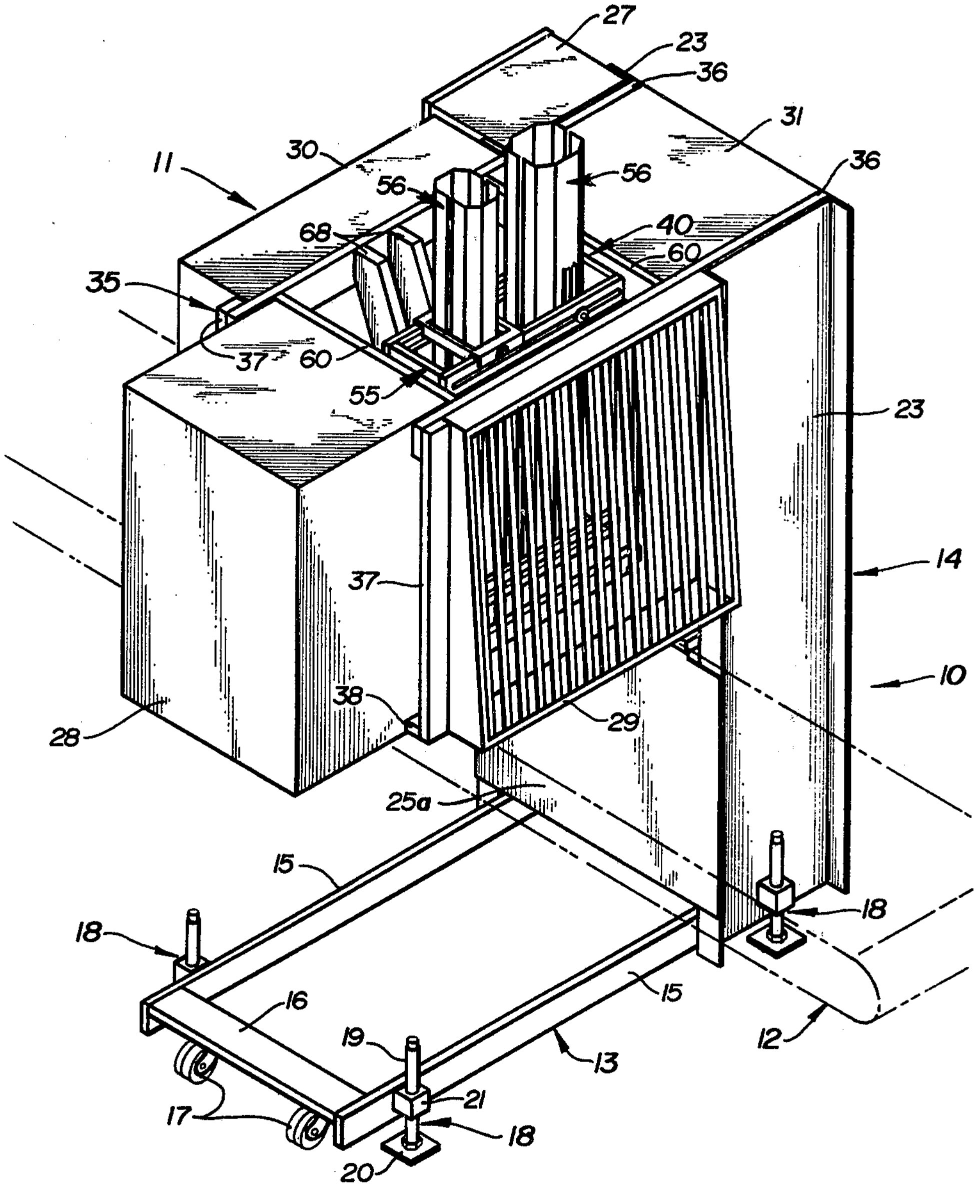
FIG. 1 is a perspective view of a pendulum-type slicing apparatus embodying this invention.

Having reference to the drawings, it will be seen that a pendulum type slicing apparatus embodying this invention is illustrated in its entirety in FIG. 1 which is a perspective view of such a machine. This illustrative embodiment is of a type which is particularly adapted for utilization with a conveyor for transporting of receivers for sliced food products. Basically, the structure comprises a structural frame 10 and a slicing head 11 with the frame constructed to enable positioning of the slicing head over a conveyor. Although the structure could be fabricated as a fixed installation, this particular illustrative embodiment is designed for portability and movement from one position to another, either with respect to a single conveying system indicated in broken lines at 12 or utilized with a fixed station type operation. Included in the structural frame 10 is a base frame 13 and an upstnding frame housing 14 which is positioned adjacent to one end of the base frame. Carried by the frame housing 14 is a slicing head 11 which is attached to that housing at an upper end thereof and is suspended in a cantilever fashion with respect to the frame housing so as to overlie the horizontal portion of the base frame 13. This arrangement of components is particularly advantageous as it greatly facilitates the portability of the apparatus for positioning at a desired point with respect to a conveying system 12 as is illustrated in FIG. 1.

Included in the base frame 13 are a pair of elongated beams 15 disposed in spaced parallel relationship and interconnection at their opposite ends by respective transverse beams 16. Portability of the appartus is provided by means of a set of four castered wheels 17 which are bolted to the transverse beam 16 as can also be seen in FIGS. 2–5. Stability of the apparatus, when positioned in a desired operating position, is achieved through a set of four vertically adjustable feet 18. Each foot 18 includes an elongated threaded shaft 19 carrying a base plate 20 at its lower end. The upwardly extending portion of the shaft 19 is threaded through an attachment block 21 for each respective foot that is secured to the side of the elongated beams 15 adjacent their extreme end portions. Operation of the vertically adjustable feet 18 is readily apparent in that with the machine positioned at a desired point, the threaded shafts 19 are turned to cause the base plates 20 to lower and contactingly engage a supporting surface such as a floor. Once the shaft is threaded to a position whereby the frame may be slightly elevated to remove at least a portion of the weight from the castered wheels 17, a lock nut 22 is then turned on the shaft to contactingly engage a surface of the attachment block 21 and thus secure the shaft in fixed position in its block. The adjustable feet 18 also provide a means for leveling of the apparatus.

Figure 5:
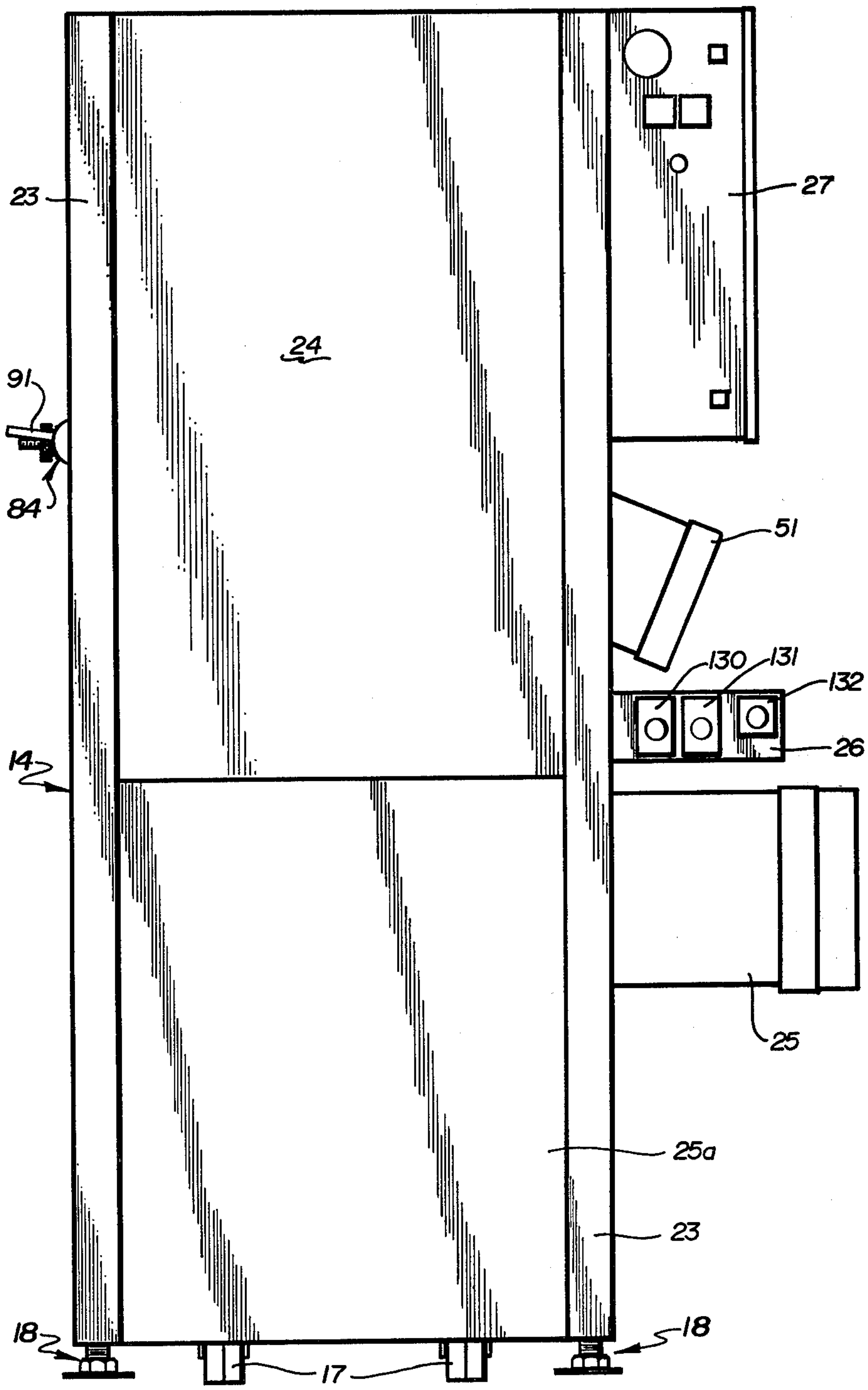
FIG. 5 is a right side elevational view thereof on an enlarged scale.

The frame housing 14 projecting upwardly from the one end of the base frame includes a pair of uprights 23 which may be advantageously formed from elongated C-shaped channels and thus provide the necessary structural rigidity and support for the other components, particularly the slicing head 11. Referring to FIG. 5, it will be seen that the upper end of the structure is closed by a panel 24 for purposes of both safety and appearance. The particular illustrated embodiment of the apparatus is designed to be powered by a hydraulic system and includes a hydraulic pump which is driven by an electric motor 25. A reservoir 25A for the hydraulic fluid is shown and is mounted in the base portion of the frame housing, but other associated components such as the hydraulic pump and its control valves, are not illustrated as such elements and their function are well-known to those familiar with this particular art. Also carried on the frame housing 14 are control and operating panels 26 and 27 for both the hydraulic and electrically operated components with it being understood that some of the hydraulic controls may be electrically actuated.

As previously indicated, secured to and carried by the frame housing 14 at its upper end in a cantilevered manner is the slicing head 11. This slicing head 11, as shown in FIG. 1, is provided with protective covers and guards for operational safety with these covers and guards being removble to facilitate cleaning and maintenance. As seen in FIG. 1, these covers and guards include an end cover 28 which provides protection as to the slicing mechanism to be described in further detail, front guard 29, rear cover 30 and top cover panel 31. The top cover panel 31 closes the upper end of the frame housing to prevent objects from inadvertently entering that frame housing and perhaps engaging with the slicing mechanism. The end cover 28 is a closed panel housing which is secured to an internal structural frame of the slicing head and thus provides complete coverage as to the sides, top, bottom and end areas with respect to that portion of the slicing head. The front guard 29 may be of a screen or bar-grid type as is illustrated which provides adequate protection, but enables the operator to visually observe functioning of the various components in the center of the slicing head. The rear cover is also a closed panel housing for optimum protection.

Construction and arrangement of the various components forming the slicing head 11 are best seen in the enlarged figures of the drawings, and in particular, FIGS. 2–8. The various covers and guards have been omitted from the slicing head and associated portions of the apparatus to facilitate illustration of these components. Included in the slicing head is a primary structural frame 35 which includes a pair of elongated beams 36 extending horizontally and vertically disposed above the elongated beams 15. Attached to the outermost ends of each of the elongated beams 36 is a respective one of a pair of vertical struts 37 with those struts being interconnected at their lowermost ends by a transverse beam 38. Marginal end portions of the elongated beams 36 extend across the inwardly facing surfaces of the uprights 23 and are securely bolted thereto. Accordingly, the structural frame 35 of the slicing head will be seen as suspended in a cantilever manner with respect to the frame housing.

Mounted on the primary structural frame 35 of the slicing head is the product carrier 40 and slicing means 41. As previously noted, the slicing means incorporated in this apparatus is preferably of the type shown in U.S. Pat. No. 4,230,007 issued Oct. 28, 1980 to J. E. Grote. This slicing means 41 includes an endless, flexible-band blade 42, a pair of blade supporting wheels 43, respective wheel supporting brackets 44 and 45 and a mounting beam 46. The slicing means is thus seen as comprising an elongated assembly which is positioned horizontally on the primary structural frame 35 of the slicing head to extend longitudinally thereof with one of the wheels and its associated supporting bracket 45 being substantially enclosed within the uprights 23 of the frame housing 14. The other blade supporting wheel and its associated bracket 44 are thus disposed in outwardly extending relationship to the vertical struts 37, but are normally protected and enclosed by the end cover 28. A guide and support 47 are provided for the lower run of the blade 42 in substantially the same manner as shown in association with the upper run in the cited Grote patent. One further difference between the apparatus shown in the referenced patent and the slicing means is incorporated in the present apparatus is that the blade in the present apparatus is mounted in an inverted manner to position the beveled edge in proper relationship for enabling the bottom run to cut from the bottom of a food product.

This guide and support 47, as is fully described in the cited Grote patent, includes an elongated slot which receives the major portion of the blade and provides a back support at one longitudinal edge of the blade while the beveled cutting edge projects a slight distance outwardly of the slot. The side walls of the slot provide support and rigidity to the blade to prevent its oscillation or movement, thereby enhancing its ability to remain in a fixed position at a desired cutting line or cutting plane. Providing of the guide and support better assures that a uniform thickness slice is consistently obtained through the cutting operation.

It will also be noted that the slicing means 41 includes means for tension adjustment in the form of a horizontally slidable, adjustment support 48 that is incorporated in the outboard wheel supporting bracket 44. A screw-threaded adjusting rod and hand wheel 49 is provided in mechanically coupled relationship to the adjustment support 48 to effect the desired tension adjustment. Mounting of the slicing means is effected through positioning of the mounting beam 46 on the transverse beam 38 at the outboard end of the slicing head and a similar transverse beam 38*a* which extends between the uprights 23 adjacent a vertical edge of those uprights. Additional rigidity for the slicing means is provided by an upper frame element 50 which extends between and interconnects with the wheel supporting brackets 44 and 45.

Figure 3:
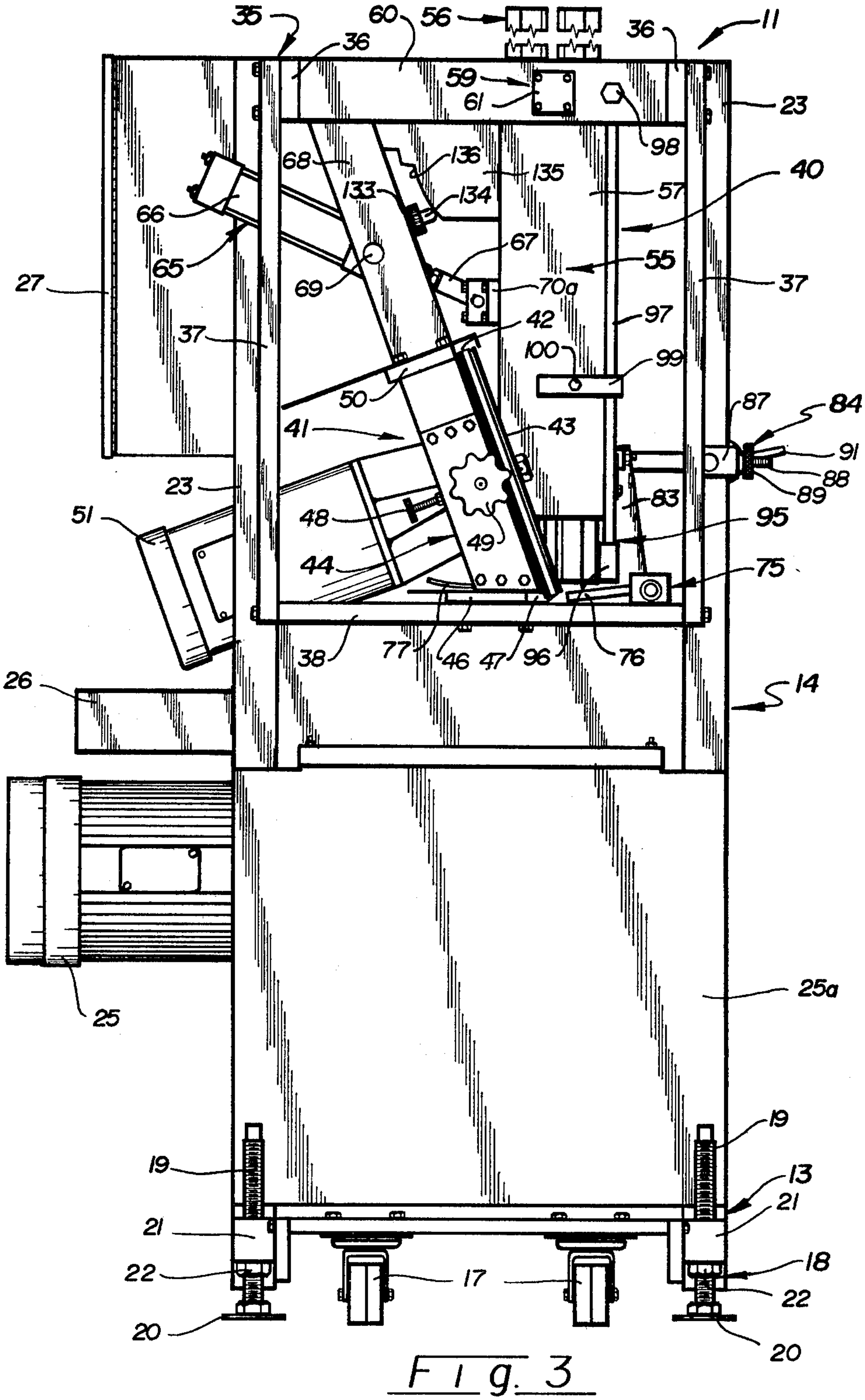
FIG. 3 is a left side elevational view thereof on an enlarged scale with safety covers and guards removed.
Figure 4:
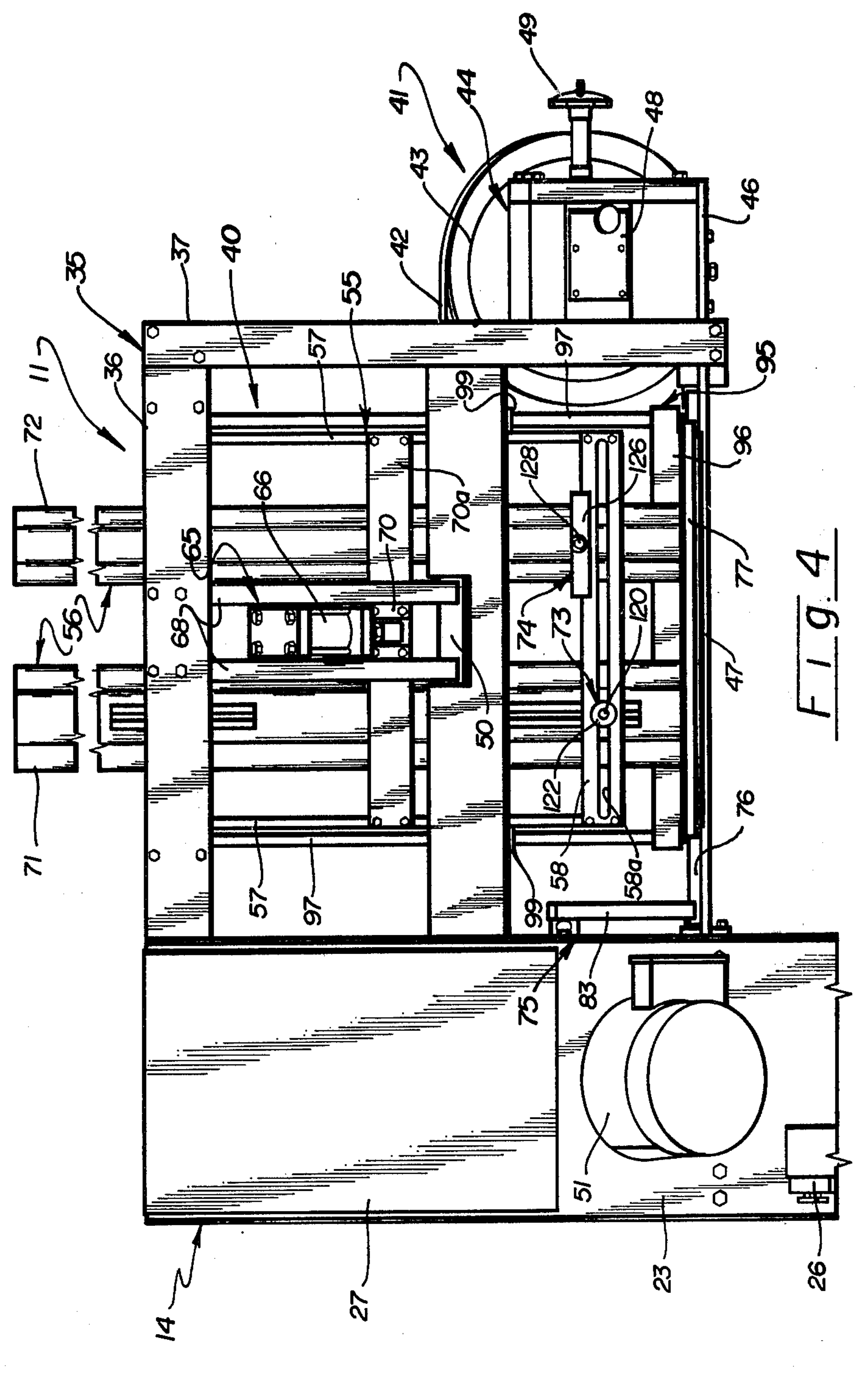
FIG. 4 is a fragmentary rear elevational view thereof on an enlarged scale with safety covers and guards removed.

Revolution of the blade 42 is effected by an electric motor 51. The electric motor, as can be best seen in FIGS. 3 and 4, is positioned to extend through the rear upright 23 to which it is mechanically mounted and is disposed in perpendicular relationship to the slicing means 41. A shaft of the electric motor is mechanically coupled with the axle of the respective blade supporting wheel 43. Operating control of the electric motor is effected through switches and control mechanisms incorporated in the control and operating anel 26 and 27. It will be understood that although an electric motor is described as being provided for driving of the blade 42, other drive mechanisms may be alternatively provided. For example, a hydraulic motor may be substituted for the electric motor and utilize the hydraulic system provided for operation of other components of the apparatus with due regard to the system capacity. A hydraulic system would be provided in that case to adequately power all components.

Forming the product carrier 40 is a structurally rigid swing frame 55 and a pair of elongated product receivers 56. The swing frame 55 comprises a pair of spaced apart and vertically extending end plates 57 which are interconnected at both front and rear by a plurality of vertically spaced cross bars 58. Thus, it will be seen that the end plates 57 and cross bars 58 cooperatively define a box shaped structure which is open at both the top and bottom ends. If desired, side panels could also be provided for forming a substantially closed structure, however, in the illustrative embodiment, the space at the front and back of the frame is essentially open. The product receivers 56 are positioned and supported in fixed relationship within the interior space defined by the end plates 57 and the cross bars 58 and their construction and configuration will be described in further detail.

In accordance with this invention, the product carrier 40 is mounted for swinging movement in the manner of a pendulum for carrying the products supported therein into slicing relationship with the blade of the slicing means 41. This swing mounting of the product carrier is obtained through securing of the upper end portions of the end plates 57 to the primary structural frame 35 by means of mounting bearings 59. A pair of mounting bearings 59 are provided with each being carried by a transverse support bar 60 which extends between and is rigidly secured at its opposite ends to the elongated beams 36. These support bars 60 being rigidly interconnected with those beams also serve to enhance the structural rigidity of that frame 35. The particular mounting bearings 59 illustrated in the drawings comprise a mounting plate 61 adapted to be bolted to the outer surface of the support bar and having a trunnion 62 extending through the support bar and into a bearing journal formed in each respective end plate. It will also be noted that the bearing axis for the product carrier is located vertically above the cutting edge of the blade 42 resulting in the center of the carrier being at the blade's cutting edge when the carrier is vertically disposed.

Since the end plates 57 and product receivers must have a predetermined width so as to accommodate the food products to be sliced, it will be seen that the frame must be capable of swinging through an arc which is of sufficient extent to permit complete cutting across the end face of the product that may be carried in the respective receivers 56 with that end face extending both forwardly and rearwardly with respect to the carrier's center. Referring to FIG. 3, it will be seen that this movement is accommodated by positioning the cutting blade on its supporting structure so as to revolve in a plane which is inclined at an angle of the order of 20 degrees with respect to a vertical plane for a machine of the illustrative proportional dimensions. Providing blade supporting wheels 43 of a diameter as is proportionally illustrated will result in spacing the upper and lower runs of the blade such that in cooperation with the angled disposition, the frame 55 is enabled to swing through the necessary arc. As a specific illustration, in a machine having a two foot swing radius from the trunnions 62 to the blade edge, providing blade support wheels 43 of 12 inch diameter will enable the machine to accommodate a five inch diameter or thick food product.

Figure 2:
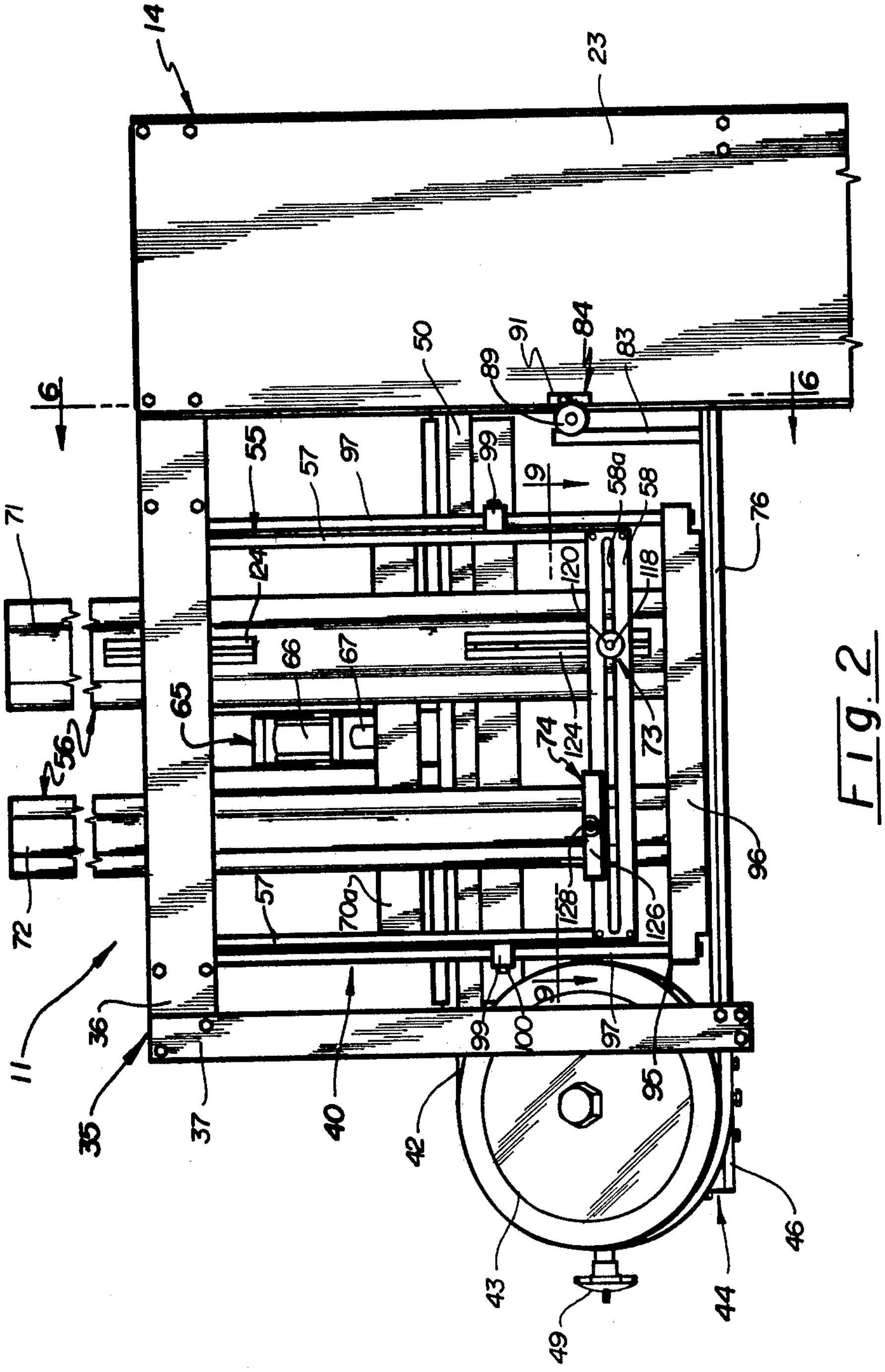
FIG. 2 is a fragmentary front elevational view thereof on an enlarged scale with safety covers and guards removed for clarity of illustration.

Cyclic reciprocation of the product carrier 40 in this embodiment is effected by a hydraulic fluid operated ram 65 as can be best seen in FIGS. 2, 3 and 4. This ram comprises a cylinder 66 and an internal piston connected with an outwardly projecting piston rod 67. The cylinder 66 is supported on the primary structural frame 35 of the slicing head by a pair of mounting bars 68. These mounting bars 68 extend in a downward direction from their point of attachment to the upper rear elongated beam 36 to a point of termination in secured relationship to the upper frame element 50 of the slicing means. These bars thus not only provide the mounting support for the ram 65, but also aid in enhancing the structural rigidity of the slicing head frame. Specific mounting of the cylinder 66 is by a pair of trunnions 69 carried at a forward end of the cylinder housing and projecting laterally outward into bearing journals formed in each of the respective bars. Mechanical coupling of the piston rod 66 to the product carrier is effected by a pivot coupling 70. This pivot coupling is secured to the end plates 57 by means of cross bars 70*a* secured to the swing frame end plates 57. Fluid coupling of the cylinder 66 to the hydraulic system is effected by means of flexible hoses. These hoses are not fully shown or described in any substantial detail as such fluid connections are well-known. Cyclic operation of the hydraulic ram is effected through the hydraulic fluid control system which also includes control elements mounted on the respective control and operating panels 26 and 27.

In this illustrative embodiment of the apparatus as can be best seen in FIGS. 2, 4, 7, 8 and 9, a pair of product receivers 56 are shown positioned in the swing frame 55. Each of these receivers comprises an elongated tube that may be formed from sheet metal or other suitable material, plastic for example, and has a cross-sectional configuration designed to cooperate with a particular product. These tubes are open at both the top and the bottom and the product is fed into the receivers through the top end. By gravity, the food product then moves downwardly through the respective receiver to exit at the lower end under control of a slice thickness determining mechanism to be described hereinafter. Each of the illustrative product receivers 56 is formed in two channel shaped sections 71, 72, respectively, that are independently supported on the swing frame 55 to define an elongated tube for containing the product. Securing of the receivers in fixed relationship on the swing frame and at a desired vertical or transverse position is effected by means of clamping devices 73 or attachment mechanism 74 that are described hereinafter in further detail. It will suffice at this point to note that the receivers are of a design construction to be selectively positioned transversely across the swing frame to a desired position for placing the severed food product slices on the conveyor or slice receiver at a desired point. Also, the two-channel tube construction enables the cross-sectional area to be varied to a certain degree thereby enabling the tube to accommodate different sized food products as well as to be adjusted to best perform with a particular size food product. Vertical adjustment is provided to enable the bottom end of each tube to be properly positioned with respect to the cutting blade 42.

Control of the thickness of the slices that are severed from the food product is effected by a support plate structure 75 which can be best seen by reference to FIGS. 2, 3, 7 and 8. This support plate structure includes a thickness control plate 76 disposed in preceding relationship to the lower run of the blade 42 and a limiting plate 77 disposed in trailing relationship to the blade. The limiting plate 77, as can best seen in FIG. 3, has the sole function of preventing further downward displacement of the food product carried in the respective receivers 56 during the time that the swing frame 55 is swung in a counterclockwise direction to its maximum extent such as at the end of a cutting stroke and prior to a return stroke. The thickness control plate, however, has an important function other than supporting the food product within the respective receivers during such times as the swing frame 55 is swung in a counterclockwise direction as seen in FIG. 3 such as to the extreme right thereof and defined as an initial or start position. This additional important function of the control plate 76 is to provide a convenient means of enabling the operator to obtain a predetermined slice thickness and to selectively adjust the mechanisms to obtain different thicknesses as may be required for particular food products of their use. Accordingly, the thickness control plate 76 is pivotally mounted so as to be angularly positioned with respect to the cutting plane defined by the cutting blade 42 and this cutting plane is essentially oriented parallel to a horizontal plane.

The plate extends entirely across the effective cutting path and has a width sufficient to accommodate the full width of the swing frame and the product receivers and thereby fully support the food product carried thereby. Secured to each of the opposite ends of the control plate are respective trunnions 78 which project a distance outwardly and are disposed in respective bearing blocks 79. In a preferred embodiment of the apparatus, each of the bearing blocks 79 is connected to an adjustment block 80 that is affixed to a respective one of the transverse beams 38 and 38*a*. Each of the adjustment blocks 80 is provided with slotted apertures for the attachment bolts 81 to permit longitudinal adjustment with respect to those transverse beams. This adjustment provides a means for controlling the spacing between a transverse edge of the thickness control plate with respect to the cutting edge of the blade 42. Vertical adjustment is also provided by means of a bolt and slot-type interconnection 82 whereby the bearing blocks 79 may be vertically adjusted with respect to those transverse beams 38 and 38*a*. Angular adjustment of the control plate 76 is effected by a lever arm 83 secured in fixed relationship to the control plate at one end thereof, such as adjacent the uprights 23, and a length adjusting mechanism 84. The length adjusting mechanism includes an elongated rod 85 having one end thereof pivotally interconnected with the upper end of the lever arm 83 by a pivot pin 86. The opposite end of the rod 85 extends through or into a mounting block 87 terminating in a screw-threaded end portion 88 that extends axially out the opposite end of the block. A knurled nut 89 is threaded onto the end portion 88 and, through rotation thereof, will enable a relative length adjustment as to the rod and consequently the angular position of the thickness control plate. The mounting block 87 may be affixed to the vertical flange of the upright 23 and a rod clamping mechanism is also advantageously provided. This rod clamping mechanism includes a clamping pin 90 extending through the mounting block 87 transversely with respect to the rod 85 and having the rod extend therethrough. An end of the clamping pin projects through the flange of the upright 23 and has a clamping lever arm 91 threaded onto the end thereof. Maintenance of the angular position of the thickness control plate 76 set by means of the rod 85 and knurled nut 89 can be assured through operation of the clamping pin and its associated arm.

Having specific reference to FIG. 3, it will be clearly seen that with the product carrier 40 mounted for swinging movement that this results in a bottom edge of the food product traversing an arcuate path as it passes the cutting blade 42. Since it is desired that the product be severed into thin planar slices, it will be further apparent that the product, as it moves down through the respective receivers carried on the swing frame, will project a distance below the bottom edge of that swing frame in order that it may be presented for slicing by the blade 42. This movement, particularly with respect to the thickness control plate 76, results in the front edge or side of the swing frame becoming relatively more elevated with respect to a horizontal plane than the rear side. As a consequence, there may be a relatively larger gap or spacing between the bottom of the product receivers 56 and the uper surface of the control plate 76. At its furtherest extent of swinging movement in a counterclockwise direction as viewed in FIG. 3, that is at a point of initiation of a slicing stroke, there is a greater possibility that the cutting forces that will be generated may extrude or tend to extrude the product through that gap at this particular point in travel.

In accordance with this invention, to minimize that problem presented by the gap, a pusher assembly 95 is provided to reduce the effect of that space or gap. The pusher assembly 95 includes an elongated pusher bar 96 which is supported to extend transversely across the front of the swing frame 55 at its lowermost end. Supporting the pusher bar 96 are a pair of vertically extending rods 97 having their lowermost ends mechanically secured to the pusher bar. There are two such rods 97 which are disposed at respective opposite sides of the swing frame in substantial alignment with the front edge surfaces of the end plates 57. Each of the rods 97 extends upwardly and is secured to a pivot 98 carried by the respective support bar 60. Respective guide blocks 99 are provided for maintaining each of the rods 97 in predetermined relationship to the respective end plate and to thereby effectively cause the pusher bar 96 to be held in close, adjacently disposed relationship to the front edge surfaces of those end plates. Each of the guide blocks 99 is provided with a guide surface through which the rod extends and may be axially reciprocated. Also, each of the guide blocks 99 is mounted on a respective end plate 57 by a pivot bolt 100 to permit these blocks to oscillate to a limited degree and thereby accommodate differences in relative movement as between the rods and the end plates.

Figure 7:
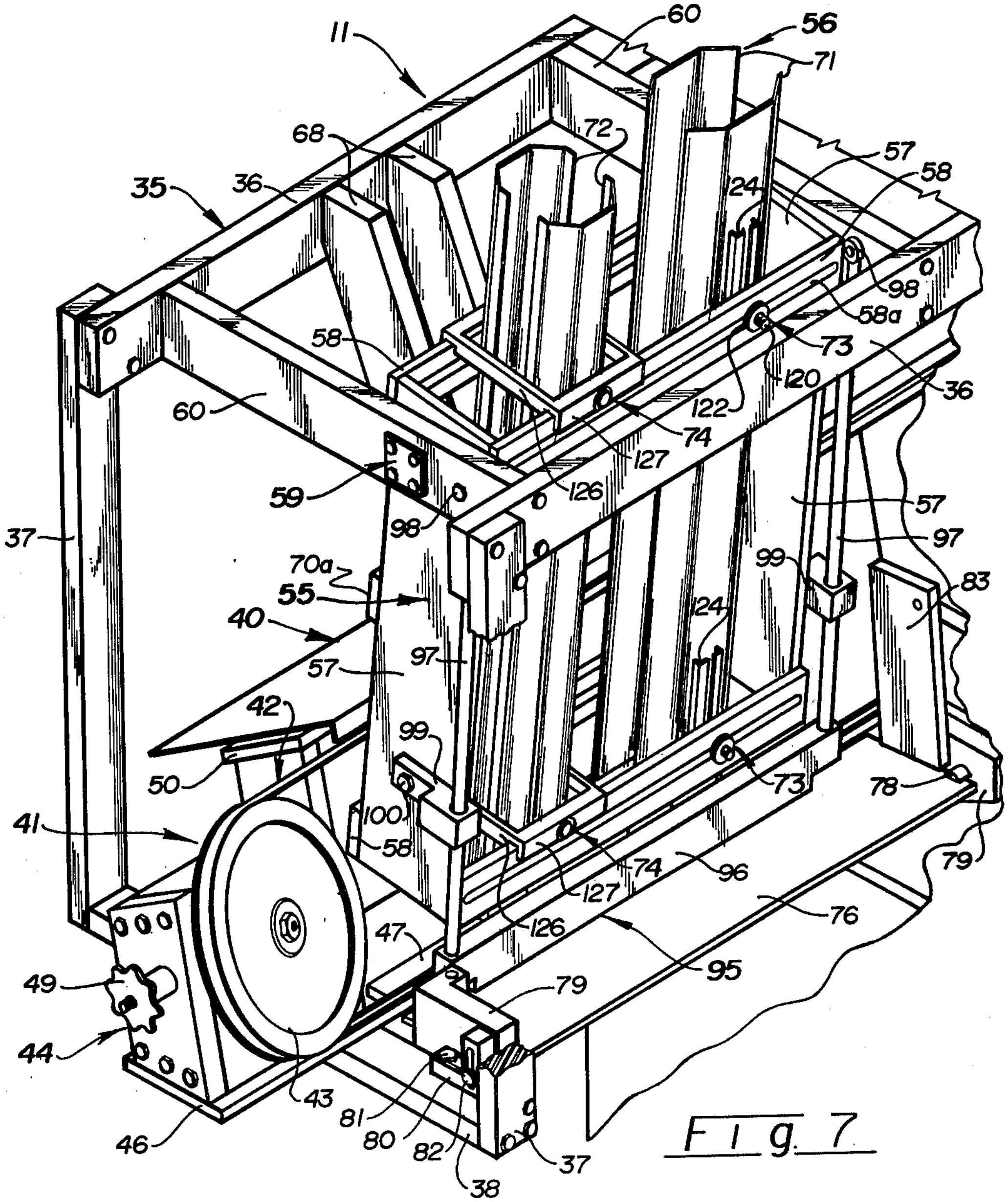
FIGS. 7 and 8 are complementary perspective views on an enlarged scale of the pendulum product carrier, product support plate and slicing mechanism.
Figure 8:
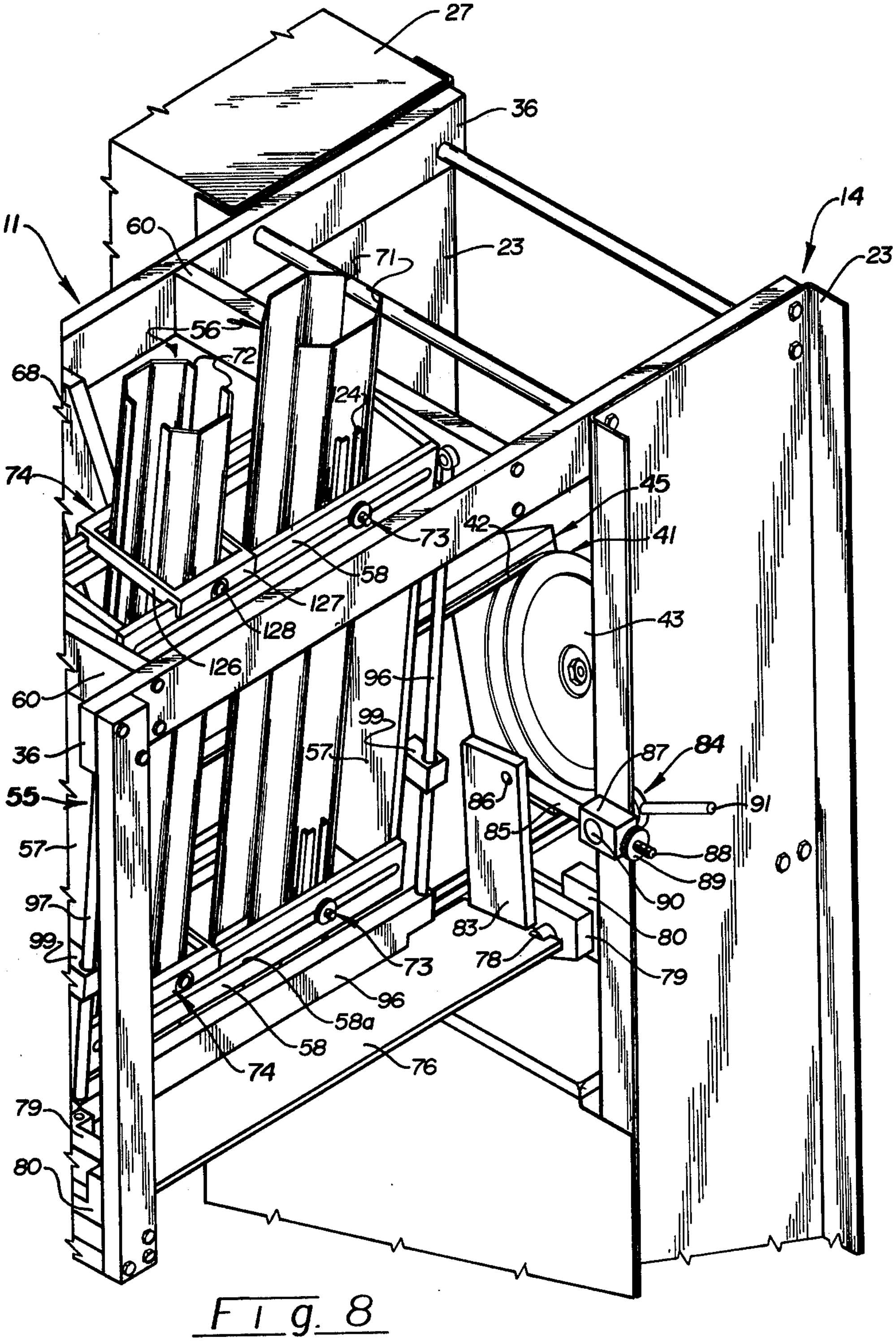

With the pivots 98 for the pusher bar support rods 97 located as illustrated in FIG. 3 and as can also be seen in FIGS. 7 and 8, it will be noted that the swing frame 55 and the pusher bar 96 will oscillate through respective arcs as determined by their respective axes of revolution. Since the two axes of revolution are horizontally displaced, it will be readily apparent that these two arcs do not coincide and actually would intersect during the course of movement between extreme displacement positions of the swing frame. When the swing frame is displaced to its fullest extent in a counterclockwise direction as seen in FIG. 3, it will be at a relatively higher elevation than will be the pusher bar 96. Consequently, the pusher bar will, in effect, form a downward extension of the product receivers 56. As the swing frame moves in a clockwise direction, the pusher bar will progressively elevate with respect to the swing frame while the swing frame is moving in a downward portion of its arc of movement. This results in an automatic interchange of function with the pusher bar becoming ineffective as it approaches the cutting blade 42. However, during this portion of movement, the need for the pusher bar decreases.

Figure 10A:
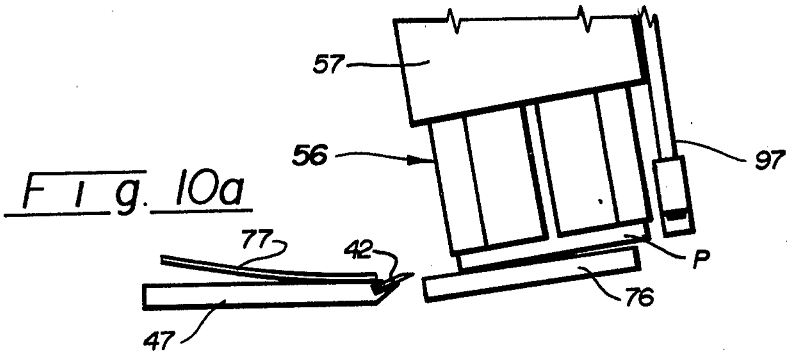
FIGS. 10A–10D are a series of diagrammatical, fragmentary vertical side elevational views of the product carrier, support plate and slicing mechanism and sequentially illustrating an operating cycle.

Operation of the slicing apparatus of this invention is diagrammatically illustrated in a sequential manner in FIGS. 10A–D. These figures are side elevational views to illustrate the functional relationships between the product carrier 40 and its swing frame 55 and the support plate structure 75 and the blade 42 with its associated guide and support 47. In these diagrammatic figures, it is assumed that the thickness control plate 76 is disposed at a desired predetermined angle, vertical elevation and horizontal position with respect to the cutting blade to produce the desired thickness of slice. Referring first to FIG. 10A, it will be seen that the product carrier 40 has been displaced counterclockwise to its extreme forward position and that the stick of the food product to be sliced, indicated at P, is extending downwardly from the respective receiver 56 and is resting on the thickness control plate 76. At this point, it will also be noted that the pusher bar 96 is at its relatively furtherest downward position with respect to the receivers and is effectively closing the space between the bottom of the receivers and the upper surface of the thickness control plate.

Figure 10B:
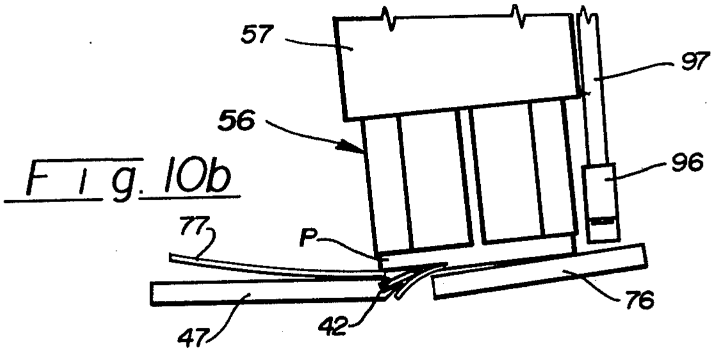
Figure 10C:
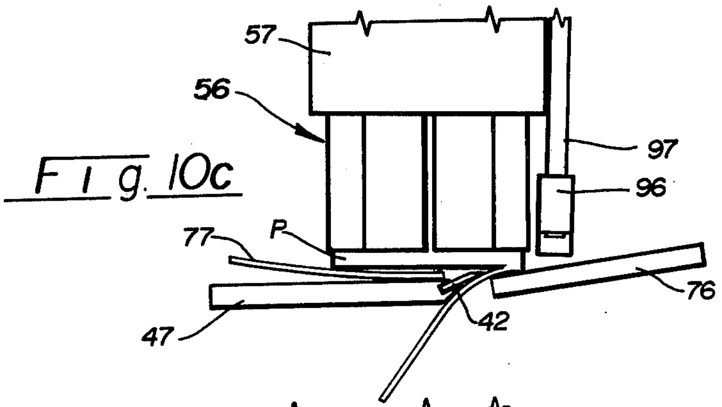
Figure 10D:
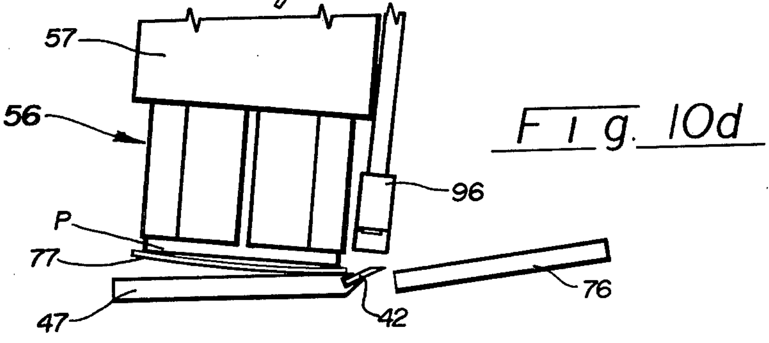

In FIG. 10B, it will be seen that the product carrier 40 has moved clockwise to a position wherein the leading edge or side of the stick of food product P has been brought into operative engagement with the cutting edge of the blade 42. Movement of the product carrier to this position will illustrate the operation of the pusher bar 96 in following the receptacles or receivers 56 and maintaining a minimum gap or space through which the food product could possibly be caused to extrude as a consequence of the slicing forces produced by the blade. FIG. 10C illustrates another point in the slicing operation with the swing frame 55 and its product receives 56 further displaced along its arc of movement although the slice has not been completely severed. At this point, it will be seen that the pusher bar 96 is now moving relatively upward with respect to the product receivers 56. As the swing frame moves to its furtherest extent in a clockwise direction as shown in FIG. 10D, the cutting blade will have moved completely through the product P thereby severing the slice which then drops by gravity to a suitable receiver such as a conveyor or container while the food product P is maintained in its position in the receiver 56 by the limiting plate 77. Also, at this point, the pusher bar 96 as a consequence of its different location for axes of revolution, will have been displaced a sufficient distance upwardly to avoid any interference or contact with the cutting blade 42. Upon conclusion of the cutting or slicing operation, the apparatus will function to effect a reversal in the swinging movement of the swing frame 55 resulting in the frame moving in a counterclockwise direction with the receiver and pusher bar moving relatively oppositely with respect to a vertical direction to the initial starting position as shown in FIG. 10A.

Figure 12A:
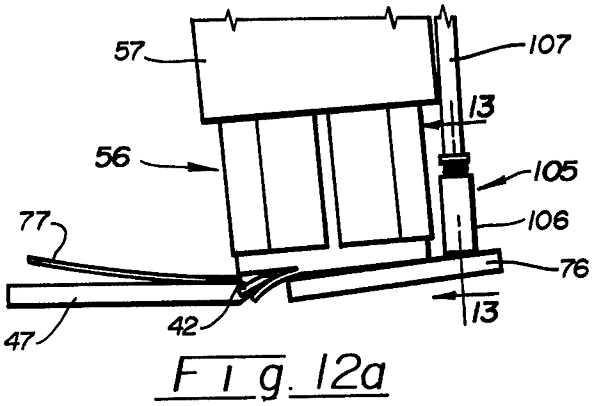
FIGS. 12A–12B and 12C are a series of diagrammatically, fragmentary vertical side elevational views of product carrier provided with a modified pusher bar and sequentially illustrating an operating cycle.
Figure 12B:
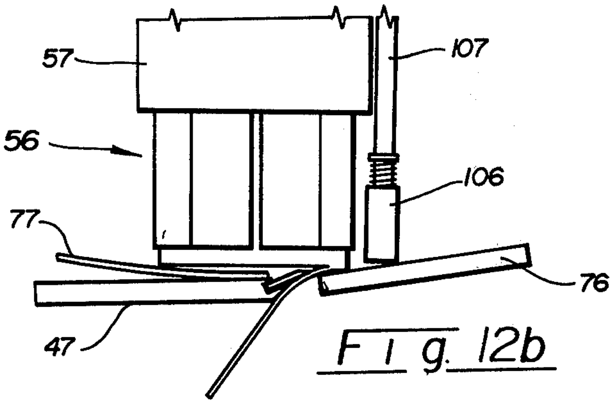
Figure 12C:
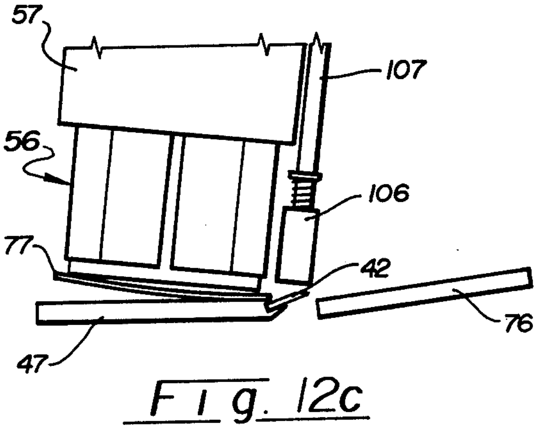
Figure 13:
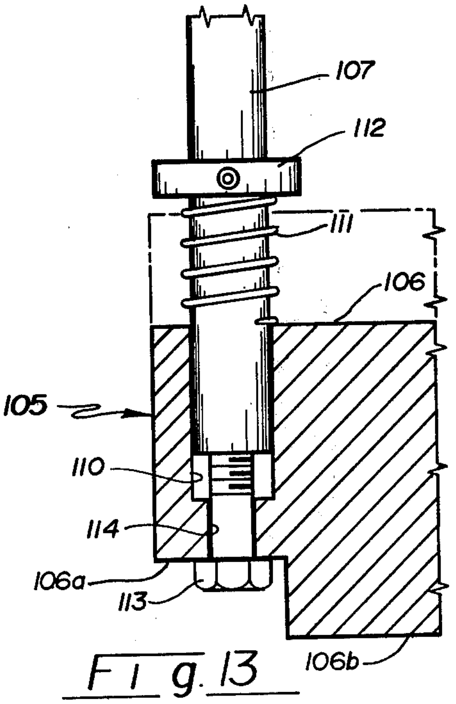
FIG. 13 is a fragmentary vertical elevational view on an enlarged scale taken along line 13–13 of FIG. 12A.

A modified pusher assembly 105 is shown in FIGS. 12A–C and 13. This modified assembly is designed to better assure that a pusher bar 106 will be maintained in close association with the upper surface of the thickness control plate. Only a fragmentary portion of the modified assembly 105 is shown in these figures with FIG. 13 showing only an end portion of the pusher bar 106. This assembly, in addition to the pusher bar 106, includes vertically extending support rods 107 with one rod secured at a respective end of the pusher bar and extending upwardly therefrom for pivotable mounting of the upper end on the respective support bars 60.

Attachment of the lower end of each rod 107 to the pusher bar 106 is effected by a mechanism which permits vertical reciprocating movement of the bar on the rods. The objective of this method of attachment is to better enable the pusher bar to accommodate a larger variation in vertical height relative to the product receivers and thus enable the apparatus to accommodate larger cross-sectional shapes of food products. The specific construction comprises forming of a socket 110 in the pusher bar and opening upwardly to receive a lower marginal end portion of the respective rod 107. A helical compression spring 111 is coaxially disposed on the rod having one end thereof disposed in abutting relationship to the upper surface of the pusher bar and the opposite end restrained against a stop collar 112. This collar is fixed on the rod in predetermined relationship to the pusher bar to result in obtaining the desired spring force for operation of the assembly in the desired manner. A bolt 113 is threaded axially into the lower end of the respective rod 107 and projects through an aperture 114 in an upward direction through the pusher bar. The head of the bolt operates against a surface 106*a* formed on the bottom of the pusher bar and which is displaced upwardly with respect to the bottom edge 106*b* of the bar so as to avoid interference with either the thickness control plate or other materials during the course of operation. The lower marginal end portion of the rod 107 extends into the upwardly opening socket 110 that is of a sufficient depth to permit a predetermined minimum relative axial reciprocation of the rod in the socket. This mechanism thus enables the pusher bar to oscillate on the lower end portion of the supporting rods as the bottom edge 106*b* thereof may be brought into engagement with the upper surface of the thickness control plate 76 and to thereby assure that there will be no gap or space through which the food product may be extruded through operation of the blade in a severing operation.

Functional operation of the modified pusher assembly 105 is diagrammatically illustrated in the sequential views of FIGS. 12A–C. These three figures show in sequence the movement of the pusher bar 106 as it follows the arcuate swinging of the product carrier. FIGS. 12A and 12B show how the pusher bar maintains the bottom horizontal edge thereof in contacting engagement with the upper surface of the thickness control plate for a substantial amount of the arcuate movement of the assembly during a severing operation. When in the position of FIG. 12A, the pusher bar 106 will be displaced relatively upward on the rods 107 resulting in compression of the springs 111 as is indicated in broken lines in FIG. 13 as a consequence of the bottom edge 106*b* engaging the thickness control plate 76. As the mechanism swings to the position shown in FIG. 12B, the springs 111 will assure that the pusher bar 106 is maintained in engagement with the thickness control plate. FIG. 12C illustrates the upward movement of the pusher bar as it approaches its furtherest extent of swinging in a clockwise direction as the head of the bolts 113 engage the bar surface 106*a* preventing further downward displacement of the bar on the rods and thus avoids contacting interference with the cutting blade 42 by the pusher bar.

Product receivers 56 of an elongated tubular construction are illustrated in the disclosed embodiments of the invention and are deemed convenient devices for holding and supporting of the food products for automatic feeding and in accomplishment of the severing or slicing operation. The tubular construction provides for a gravity feed and also greatly facilitates continuity of feeding of the product since additional product may be sequentially fed in through the top open ends of those tubes. In considering the proportional relationships of the components, it will also be noted that the upper end portions of the tubes do not project an extreme distance above the top of the machine and thus their oscillatory movement is of a more limited scope. Consequently, it is possible for the operator to continue feeding of the food product into the receivers while the machine remains in operation.

Referring specifically to the drawings, it will be noted that the machine illustrated therein is provided with two of these tubular product receivers. It will be understood that the number of such receivers may be increased or decreased in accordance with the particular products being sliced and the operational requirements of a particular installation of the machine. It will also be noted that the tubular receivers may be displaced to the left or right as viewed in FIG. 2 to either accommodate additional product receivers or to place a particular receiver in a specific position as determined most advantageous with respect to a receiver that may be transported on the underlying conveyor system.

Figure 9:
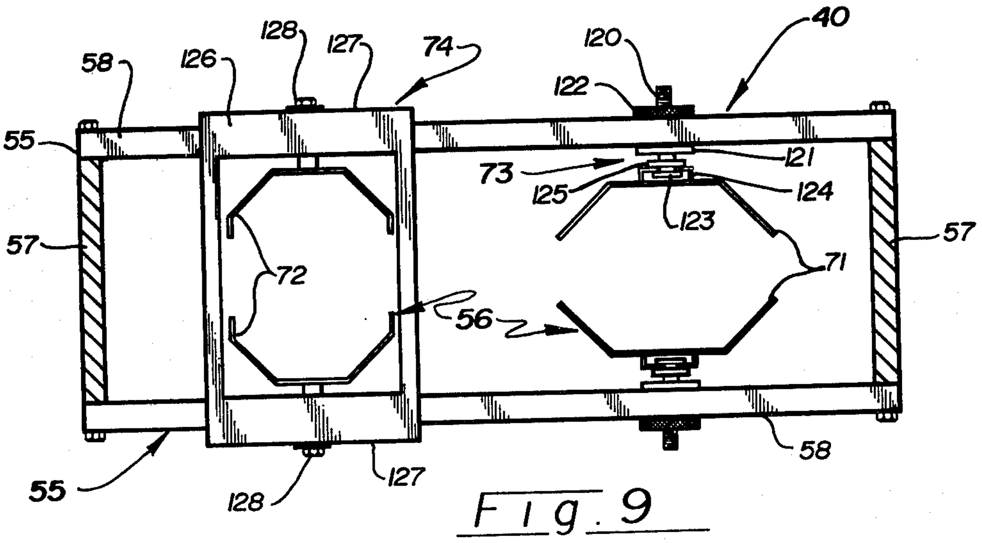
FIG. 9 is a horizontal sectional view of the product carrier on an enlarged scale taken along line 9—9 of FIG. 2.

The particular structure and construction incorporated in the illustrative product receivers 56 as previously described comprises a pair of tube-forming plates with these plates being designated by the numerals 71 with respect to the receiver shown at the right side of FIGS. 2 and 9 and 72 with respect to the receiver shown at the left side of those two drawing figures. These two sets or pairs of plates 71 and 72 are configured to essentially define an area which roughly approximates the cross-sectional configuration of the food product to be fed through the machine. As illustrated in FIG. 9, the pairs of plates 71 thus roughly define a circular cross-sectional area and are particularly adapted for use with an elongated stick-type of food product which also has a generally circular cross-sectional configuration. While pairs of plates of this type are illustrated, it will be readily apparent that the configuration of those channel-shaped plates may be modified or altered to other configurations or adaptable to a different type of food product having a cross-section other than generally circular. The particular configuration and shapes of the plates for such purpose will be readily apparent to those familiar with the food product field. A particular advantage of the dual channel-shape plate construction for the product receivers is that a single set of such plates can be positioned to provide a greater or lesser spacing therebetween and thus result in capability to accommodate further variations in the food products that may be desired to be processed through the machine. This. difference in the spacing of the pairs of plates is illustrated as between the plates 71 and the plates 72. A further difference in configuration to also illustrate the adaptability of product receivers of this type to different food products is that the plates 72 are of a configuration to define a cross-sectional area of a more oval shape.

Mounting of the receivers on the swing frame 55 was generally indicated to be by means of the cross bars 58. These cross bars are provided in pairs with two being located at the bottom ends of the end plates 57 and two being located at the upper ends thereof. FIGS. 7 and 8 also aid in showing the mounting and support of these product receivers. Each of the bars 58 is also shown as having an elongated horizontal slot 58*a* formed therein which, as can be seen by reference to the drawing figures, is intended to provide a more universal mounting and ability to cooperate with different configured product receivers. Referring to the product receiver shown at the right side of FIGS. 2 and 9, each of the channel-shape plates 71 is secured at its upper and lower ends to the respective cross bar 58 by clamping devices 73 that are designed to enable horizontal displacement of the plates supported thereon as well as to permit vertical displacement of that plate. Such a clamping device comprises a threaded bolt 120 which extends through the longitudinally extending slot 58*a* of the respective support bar. A stop nut 121 is threaded onto the bolt to be positioned at the inwardly facing side of the bar 58 and a locking nut 122 is threaded onto the bolt at the outwardly facing side of the bar. Thus, these two nuts 121 and 122 serve to secure the bolt at a desired position on the bar and, through appropriate adjustment, can axially position the bolt with respect to that bar. This axial positioning thus enables the plates 71 to be displaced toward or from each other. An inner end of the bolt 120 is provided with a head 123 which is adapted to interfit in a T-shaped channel 124 formed on an exterior surface of the respective plate 71. A locking nut 125 is also threaded onto the bolt 120 at a position to be turned and clamp flanges of the T-shaped channel 124 between the bolt head 123 and the locking nut 125. Operation of the bolt head and its locking nut can thus enable the plate 71 to be displaced vertically with respect to its support on the bars 58.

The plates 72 for the left side product receiver are supported on the respective bars 58 by attachment mechanisms 74 as previously described in general terms. The illustrative attachment mechanism 74 includes a carrier frame 126 having a central opening through which the plates 72 vertically extend. Each of the plates 72 is secured to this carrier frame 126 and in this illustrative embodiment, they are shown as being fixed and not capable of vertical adjustment. However, it will be understood that these plates may also be mounted on the carrier frame in a manner similar to that described with respect to the plates 71 to permit vertical displacement. The carrier frame 126 is provided at both the front and rear thereof with flanges 127 which are of a length to project a distance downwardly in overlapping relationship to the respective surfaces of the supporting bars 58. A locking bolt 128 is threaded into a socket in each of the flanges 127 and is of a length to engage a surface of a respective support bar 58 and function to provide a compression clamp. This particular attachment mechanism thus is readily positionable as a unit horizontally along the support bars.

Figure 6:
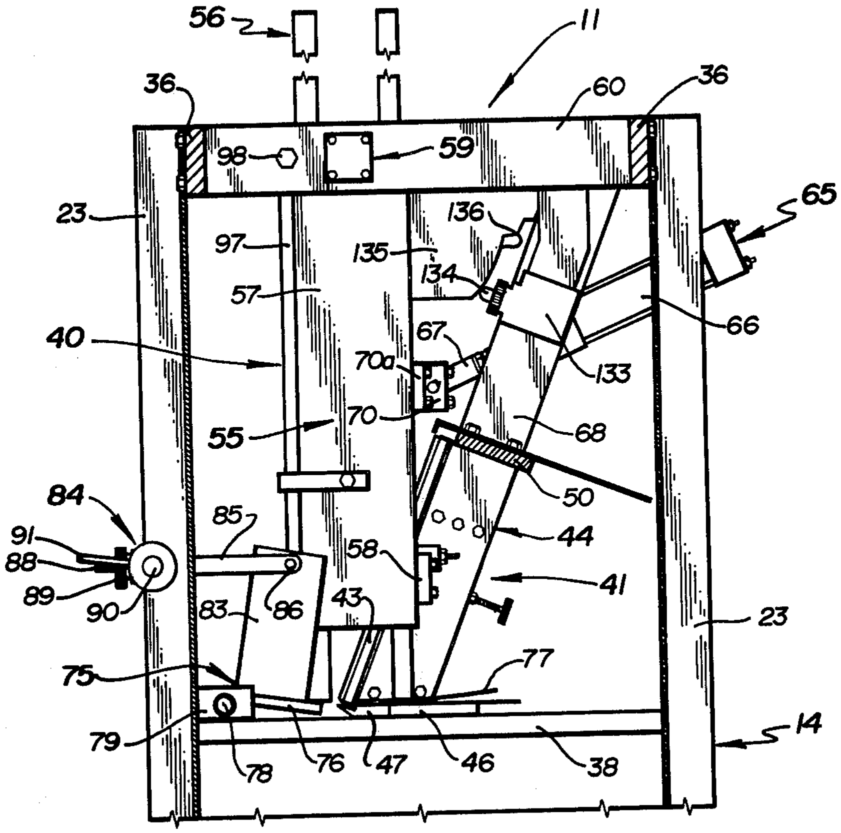
FIG. 6 is a fragmentary vertical sectional view taken along line 6—6 of FIG. 2.

Operating control of the product carrier 40 to effect its reciprocating swinging movement was generally indicated to be by means of a hydraulic system. That system was indicated to include a hydraulic fluid pump driven by an electric motor 25 and associated with a hydraulic fluid reservoir 25*a*. A control system was provided and included the electrical control elements mounted in a panel 27 and hydraulic control devices included in a second control panel 26. These control devices indicated as hydraulic fluid control valves 130, 131 and 132 provide a means for the operator to adjust the movement of the product carrier 40 such as its length of stroke and its rate of movement. Automatic control of the product carrier is provided in this embodiment of the apparatus by a cam controlled hydraulic valve 133. This cam control valve 133, as can be best seen in FIG. 6, is mounted on the frame in a fixed position and is provided with a reciprocative actuator 134. Operation of the actuator 134 is effected by a cam 135 which is mounted on one of the end plates 57 of the product carrier. This cam 135 is formed with a cam surface 136 which is shaped to cause reciprocation of the actuator 134 in accordance with the arcuate position of the product carrier. This cam surface is shaped in a manner whereby the valve 133 will be operated to effect a change in the direction of movement of the product carrier through routing of the hydraulic fluid with respect to the hydraulic ram 65 that operates the product carrier.

Figure 11:
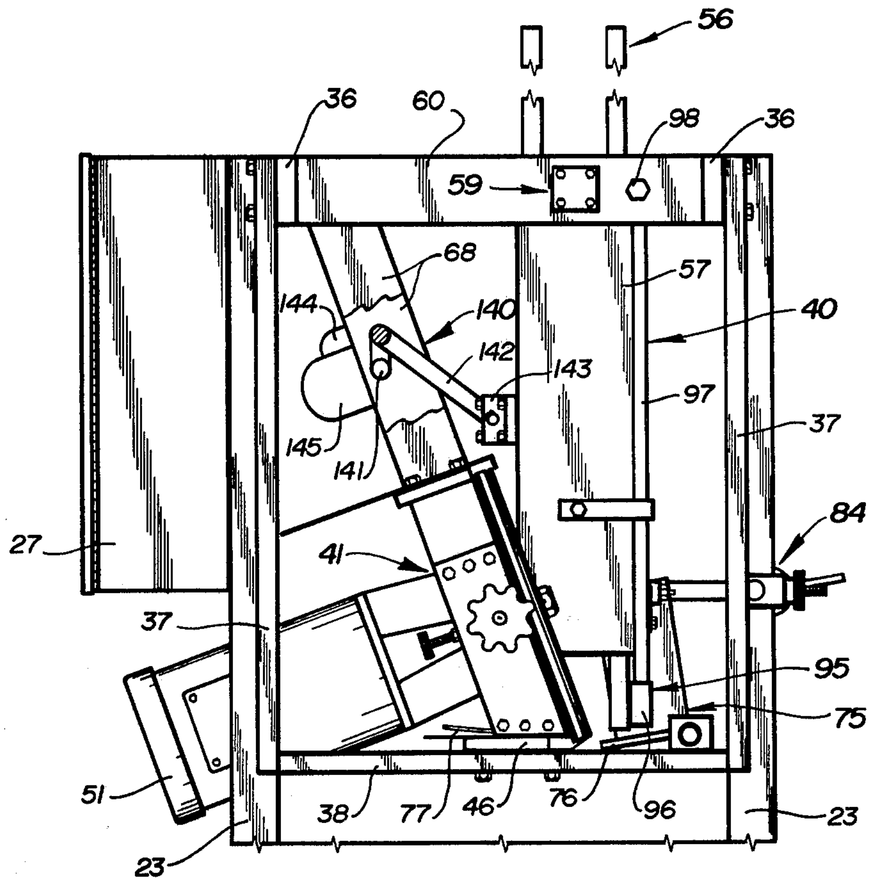
FIG. 11 is a left side elevational view of the upper portion of a modified slicing apparatus embodying this invention having a crank-type product carrier drive mechanism.

The preceding description relative to the actuating mechanisms for the swing frame 55 was directed to a hydraulic operated ram. The specific actuating mechanism for the swing frame may comprise other mechanisms and to illustrate such variations, reference will be had to FIG. 11 which illustrates a mechanical crank-type mechanism 140. This mechanical crank-type mechanism includes a crank shaft 141 which can be journalled on the mounting bars 68 and thus supported in substantially the same manner as the previously described hydraulic ram cylinder. However, in this instance, the crank shaft would be journalled in suitable bearings in those bars to accommodate the continuous rotating motion. Interconnecting the crank shaft with the swing frame is a connecting rod 142 which is also pivotally connected by a pivot coupling 143 to the cross bar 70*a*. Rotation of the crank shaft 141 may be conveniently effected by means of a hydraulic motor 144. This motor 144 may be mounted on one of the bars 68 and have its output shaft coupled with the crank shaft 141 such as by a reduction gear mechanism 145. Thus, supplying of pressurized hydraulic fluid to the motor 144 will effect revolution of the crank shaft and, in turn, the oscillatory movement of the swing frame 55. Use of a hydraulic motor is advantageous in that its speed may be readily controlled and adjusted by control valves. However, it will be apparent that an electric motor may also be utilized and provided with necessary controls and speed control drive mechanisms as deemed appropriate.

It will be readily apparent from the foregoing description of illustrative embodiments of the slicing apparatus of this invention that a particularly novel and improved apparatus is provided for this purpose. The pendulum-type mechanism is of particular advantage in that it is capable of rapid slicing and also slicing of the product in timed relationship to deposit the slices on receivers carried on an underlying conveyor. The mechanism includes thickness control and is operable to assure a uniform slice of the desired thickness. The apparatus with the cantilevered structure is extremely versatile in its utilization and can be readily positioned at any desired point with respect to a conveyor. The operating components are all included within an easily protected space for greater operator safety.

Having thus described this invention, what is claimed is:

1. A product slicing apparatus comprising a structural frame, a product carrier pivotally mounted on said frame for reciprocating movement about a substantially horizontal pivot axis, said carrier including at least one elongated product compartment extending generally perpendicular to and downward from said pivot axis and adapted to receive a product to be sliced and permit downward movement of the product toward an open, bottom end of the compartment that is spaced a predetermined distance from said pivot axis, product carrier drive means coupled with said carrier and operable to effect reciprocating swinging movement of said carrier about its pivot axis through a predetermined arc of sufficient extent to cause the entire bottom end of the product in the carrier and projecting from the lower end thereof to traverse a cutting line extending transversely across the path of movement of the product, slice thickness control means operatively interengageable with the product carrier by said product carrier for controlling the distance of projection of the product with respect to the cutting line, and slicing means mounted on said frame and including an endless slicing blade carried by support means for maintaining the blade in vertically spaced upper and lower runs having at least a portion of the lower run forming a generally rectilinear cutting blade section disposed in substantially horizontal, transversely extending relationship across the path of movement of the product at the cutting line, said slicing blade being supported to revolve in a place aligned with the cutting blade section of the lower run thereof and inclined to a plane tangent to an arc of movement of the product through the cutting line to position the upper run in sufficiently offset relationship to a plane perpendicular to the tangent plane to permit said product carrier to swing over the lower run in effecting complete cutting of the product carried thereby, and blade drive means operatively coupled with said blade to effect revolution thereof in performance of slicing operations.

2. A product slicing apparatus according to claim 1 wherein said blade support means includes two support wheels that are each disposed relatively outward with respect to the path of movement of the product carrier and in spaced apart relationship to each other to permit said product carrier to pass therebetween.

3. A product slicing apparatus according to claim 1 wherein said endless slicing blade is supported in a plane that is angularly displaced relative to a vertical plane extending through the lower run thereof.

4. A product slicing apparatus according to claim 3 wherein said elongated product compartment is mounted on said carrier to position a plane passing through a central longitudinal axis of said compartment in a direction perpendicular to the path of movement parallel to and intersecting said pivot axis, said cutting line being located vertically below said pivot axis.

5. A product slicing apparatus according to claim 1 wherein said slicing blade is formed with a beveled cutting edge portion and is positioned with the beveled surface thereof facing upwardly and the extreme edge of said blade at said cutting line.

6. A product slicing apparatus according to claim 1 wherein said product carrier includes a plurality of elongated product compartments disposed in relatively spaced relationship in a direction parallel to said pivot axis.

7. A product slicing apparatus according to claim 6 wherein said plurality of product compartments are selectively positionable in predetermined relationship to each other in a direction parallel to said pivot axis.

8. A product slicing apparatus according to claim 1 wherein said slicing thickness control means includes a surface-forming member supported on said frame with a surface thereof disposed to limit the distance the product projects from the bottom end of a product compartment and with respect to the cutting line, said surface being selectively positionable to obtain a predetermined slice thickness.

9. A product slicing apparatus according to claim 8 wherein said surface-forming member comprises a plate having a product supporting surface, said plate positioned in preceding relationship to the cutting line with the surface thereof generally horizontally disposed in substantially tangential relationship to the arcuate path of movement defined by the bottom end of a product during its swinging movement in effecting a cutting operation.

10. A product slicing apparatus according to claim 9 wherein said plate is supported by means permitting selective positioning to the surface thereof with respect to the cutting line.

11. A product slicing apparatus comprising a structural frame, a product carrier pivotally mounted on said frame for reciprocating movement about a substantially horizontal pivot axis, said carrier including at least one elongated product compartment extending generally perpendicular to and downward from said pivot axis and adapted to receive a product to be sliced and permit downward movement of the product toward an open, bottom end of the compartment that is spaced a predetermined distance from said pivot axis, product carrier drive means coupled with said carrier and operable to effect reciprocating swinging movement of said carrier about its pivot axis through a predetermined arc of sufficient extent to cause the entire bottom end of the product in the carrier and projecting from the lower end thereof to traverse a cutting line extending transversely across the path of movement of the product, slice thickness control means including a plate having a product supporting surface operatively interengageable with product carried by said product carrier for controlling the distance of projection of the product with respect to the cutting line and from the bottom end of a product compartment, said plate being supported on said frame by plate support means including pivot means permitting selective pivot positioning of said plate about a substantially horizontal axis and with respect to the cutting line to obtain a predetermined slice thickness, said plate being positioned in preceding relationship to the cutting line with the product supporting surface thereof generally horizontally disposed in substantially tangential relationship to the arcuate path of movement defined by the bottom end of a product during its swinging movement in effecting a cutting operation, and slicing means mounted on said frame and including an elongated, longitudinally displaceable sliding blade having at least a portion thereof forming a cutting blade section disposed in transversely extending relationship across the path of movement of the product at the cutting line and blade drive means operatively coupled with said blade to effect longitudinal displacement thereof in performance of slicing operations.

12. A product slicing apparatus comprising a structural frame, a product carrier pivotally mounted on said frame for reciprocating movement about a substantially horizontal pivot axis, said carrier including at least one elongated product compartment extending generally perpendicular to and downward from said pivot axis and adapted to receive a product to be sliced and permit downward movement of the product toward an open, bottom end of the compartment that is spaced a predetermined distance from said pivot axis, product carrier drive means coupled with said carrier and operable to effect reciprocating swinging movement of said carrier about its pivot axis through a predetermined arc of sufficient extent to cause the entire bottom end of the product in the carrier and projecting from the lower end thereof to traverse a cutting line extending transversely across the path of movement of the product, slice thickness control means operatively interengageable with the product carried by said product carrier for controlling the distance of projection of the product with respect to the cutting line, said slice thickness control means including a surface-forming member supported on said frame with a surface thereof disposed to limit the distance the product projects from the bottom end of a product compartment and with respect to the cutting line, said surface being selectively positionable to obtain a predetermined slice thickness, a pusher bar mounted on said product carrier and supported in transversely extending relationship to the path of movement of the product carrier, said pusher bar positioned to follow the product compartment during a slicing operation in closely disposed relationship to the surface of said thickness control means, and slicing means mounted on said frame and including an elongated, longitudinally displaceable sliding blade having at least a portion thereof forming a cutting blade section disposed in transversely extending relationship across the path of movement of the product at the cutting line and blade drive means operatively coupled with said blade to effect longitudinal displacement thereof in performance of slicing operations.

13. A product slicing apparatus according to claim 12 wherein said pusher bar is mounted to reciprocate vertically with respect to the product compartment.

14. A product slicing apparatus according to claim 12 wherein said pusher bar is pivotally mounted on said frame for reciprocating movement about an axis parallel to the pivot axis of said product carrier.

15. A product slicing apparatus according to claim 14 wherein said pusher bar pivot axis is displaced a predetermined distance horizontally with respect to the product carrier pivot axis.

* * * * *